United States Patent [19]
Karlton et al.

[11] Patent Number: 5,802,284
[45] Date of Patent: Sep. 1, 1998

[54] SYSTEM AND METHOD USING COVER BUNDLES TO PROVIDE IMMEDIATE FEEDBACK TO A USER IN AN INTERACTIVE TELEVISION ENVIRONMENT

[75] Inventors: Philip L. Karlton, Cupertino; Robert K. Myers, Santa Cruz; Charles V. Rossi, San Jose; Terry Weissman, Boulder Creek, all of Calif.

[73] Assignee: Silicon Graphics, Inc., Mountain View, Calif.

[21] Appl. No.: 572,298

[22] Filed: Dec. 13, 1995

[51] Int. Cl.⁶ .................................................. H04N 7/10
[52] U.S. Cl. .................... 395/200.09; 348/13; 348/12; 348/10; 455/5.1
[58] Field of Search .......................... 348/13, 12, 7, 348/10, 473, 474, 476; 455/5.1, 4.2, 6.1, 6.2, 6.3; 395/200.09; H04N 7/10

[56] References Cited

U.S. PATENT DOCUMENTS

| | | |
|---|---|---|
| 4,987,486 | 1/1991 | Johnson et al. ......................... 348/12 |
| 5,475,843 | 12/1995 | Halviatti et al. ....................... 395/700 |
| 5,541,662 | 7/1996 | Adams et al. .......................... 348/13 |
| 5,619,249 | 4/1997 | Billock et al. ........................... 348/7 |
| 5,621,456 | 4/1997 | Florin et al. ............................ 348/7 |
| 5,635,979 | 6/1997 | Kostreski et al. ....................... 348/13 |

*Primary Examiner*—John K. Peng
*Assistant Examiner*—Linus H. Lo
*Attorney, Agent, or Firm*—Sterne, Kessler, Goldstein & Fox P.L.L.C.

[57] ABSTRACT

A computer-based system and method for providing immediate feedback to the user in an interactive television system. The system presents interactive programs to a user; each program can have a "cover bundle" for "covering" the delay between user selection of the program and the program's availability. When a user requests a program having a cover bundle, the cover bundle is downloaded first. The cover bundle provides a simple presentation (e.g., a short movie, music, and the like) to keep the user engaged while the requested program downloads.

11 Claims, 5 Drawing Sheets

SYSTEM AND METHOD USING COVER BUNDLES TO PROVIDE IMMEDIATE FEEDBACK TO A USER IN AN INTERACTIVE TELEVISION ENVIRONMENT

BACKGROUND OF THE INVENTION

1. Field of the Invention

The present invention relates generally to interactive television systems and methods, and more particularly to an interactive television system and method for providing immediate feedback to a user.

2. Related Art

A typical cable television (CTV) system comprises a television for presenting audiovisual programs (hereinafter called "programs"), a program delivery system for delivering programs as electronic signals via coaxial cable, a settop box for interfacing the television to the program delivery system, and a remote control that permits the user, by controlling the settop box, to choose different programs. Because the program delivery system is a one-way link (i.e., it delivers programs to the settop box, but does not accept feedback from it), the user has little control over the programs delivered, which are conventional broadcast programs. The user can not pause, fast-forward, reverse, or stop any program, and is limited to those programs that are currently being broadcast. The user can only change to a different program. However, because all user interaction with the CTV system occurs with the settop box, which is located proximate to the user, the CTV system responds rapidly. Typical response to a user input is well under ½ second.

In contrast to a typical CTV system, a typical interactive television system (ITV) includes not only conventional broadcast programs, but also interactive programs which the user can control. Each interactive program comprises at least one viewer application, which is a computer application designed to deliver interactive programs to, and accept and respond to input from, the user. When a user selects an interactive program, the associated viewer application must be downloaded to the settop computer.

In the ITV environment, a user expects immediate access to services at the touch of a remote control button, and is not likely to tolerate a delay significantly greater than that normally associated with changing channels (approximately ½ second). However, some large viewer applications take much longer than ½ second to download to the user's settop box. Further, should the ITV system experience degradation, viewer applications can take much longer than usual to download.

What is needed, therefore, is a means for providing immediate feedback to a user in an interactive television system to usefully fill the time between selection of an interactive application and its availability.

SUMMARY OF THE INVENTION

The present invention is a system and method for providing immediate feedback to a user of an interactive television (ITV) system despite temporary unavailability of the interactive application (hereinafter called a "viewer application") requested by the user. A typical ITV system consists of remote servers containing viewer applications networked to settop computers for downloading and presenting the viewer applications to the user via a television set. The network is asymmetrical, i.e., the amount of network bandwidth available downstream (from the remote server to settop computer) greatly exceeds that available upstream (from the settop computer to the remote server). While this arrangement facilitates program delivery, it also causes the response time for a request from the settop computer to a remote server to be somewhat lengthy, primarily due to the limited upstream bandwidth.

In order for an ITV system to be successful it must, despite being computer-based, have the look and feel of a typical cable television system (CTV) system, rather than that of a typical personal computer system. For example, when a user changes channels in a typical CTV system, the response time is generally less than ½ second. However, in an ITV system, as in a personal computer system, typical response times for starting applications can be on the order of several seconds. Unlike a typical personal computer user, a typical TV user is not likely to tolerate such delays.

One possible solution is to download a small application to maintain an active media presentation to "cover" the delay between the user's request for a viewer application and its availability. Such a "cover application" can, for example, display the name of the viewer application over an animating image or play a short movie accompanied by a piece of music until the viewer application has successfully downloaded. The cover application may also be responsive to user input, although not to the degree possible using the full viewer application. Under a conventional approach, the cover application would have to, upon execution, download a number of "asset" files (i.e., files containing images, movies, sounds, fonts, etc.); this would necessitate several round trips to a remote server. Because the upstream bandwidth is small, such round trips are very-time consuming; the total delay resulting from several such round trips could easily exceed ½ second.

This difficulty is overcome by the present invention by downloading a "cover bundle" which eliminates the need for these round trips by "bundling" the required asset files together with the cover application for delivery in a single round trip. The cover bundle provides the means to keep the user engaged with an ongoing media presentation while the requested viewer application downloads in the background.

In a first embodiment of the present invention, the cover bundle comprises a number of asset files and an executable file for managing and presenting the asset files and for retrieving the requested viewer application. In a second embodiment, the cover bundle comprises a number of asset files and a script file. The script file is employed by a script interpreter resident in the settop computer to manage and present the asset files and to retrieve the requested viewer application.

One advantage of the present invention is that it provides immediate, responsive feedback to a user of an ITV system despite any temporary unavailability of the interactive program requested by the user.

Another advantage of the present invention is that it provides immediate feedback to a user of an ITV system while large requested viewer applications are downloaded.

Another advantage of the present invention is that it provides immediate feedback to a user of an ITV system despite network degradation due to, for example, a high traffic load.

Further features and advantages of the present invention as well as the structure and operation of various embodiments of the present invention are described in detail below with reference to the accompanying drawings. In the drawings, like reference numbers indicate identical or func-

DETAILED DESCRIPTION OF THE PREFERRED EMBODIMENTS

The preferred embodiment of the invention is discussed in detail below. While specific steps, configurations and arrangements are discussed, it should be understood that this is done for illustrative purposes only. A person skilled in the relevant art will recognize that other steps, configurations and arrangements can be used without departing from the spirit and scope of the invention.

I. System Architecture

Figure 1:
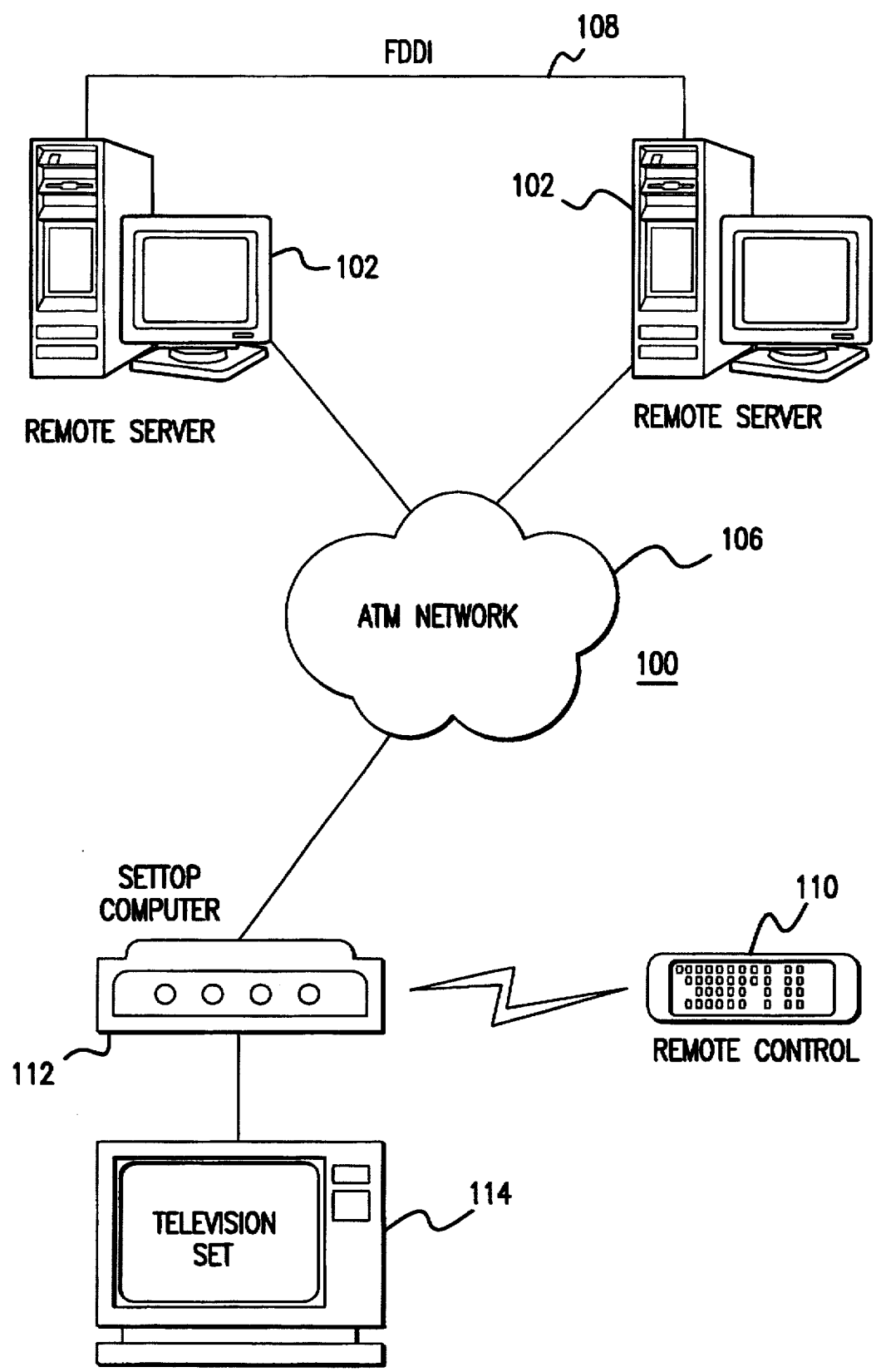
FIG. 1 is a block diagram of an ITV system in connection with the present invention.

FIG. 1 is a block diagram of an ITV system in connection with the present invention. ITV system 100 comprises remote servers 102, Asynchronous Transfer Mode (ATM) network 106, Fiber Distributed Data Interface (FDDI) network 108, remote control 110, settop computers 112 and television set 114. Remote servers 102 are interconnected via FDDI network 108, and are connected via an ATM network 106 to settop computers 112. A settop computer 112 is the interface between television set 114 and remote servers 102. The user (not shown) controls settop computer 112 using remote control 110 while observing responsive feedback on the display of television set 114, thereby interacting with ITV system 100 via settop computer 112.

ATM network 106 is asymmetrical, i.e., the bandwidth available in the downstream direction (from remote server 102 to settop computer 112) greatly exceeds that available in the upstream direction (from settop computer 112 to remote server 102). In the preferred embodiment, the maximum upstream bandwidth is approximately 50 Kbits per second and the maximum downstream bandwidth is approximately 6 Mbits per second. While this arrangement facilitates program delivery, it also causes the response time for a request from settop computer 112 to a remote server 102 to be somewhat lengthy.

ITV system 100 features both "passive" and "interactive" channels. A "passive" channel corresponds to a conventional broadcast television channel, while an "interactive" channel is a television channel that supports interactive programs. The user can select television channels, whether passive or interactive, using remote control 110. Each interactive channel comprises at least one viewer application, which is a computer application designed to deliver interactive programs to, and to accept and respond to input from, the user. Each viewer application can comprise a number of screens and options.

Figure 2:
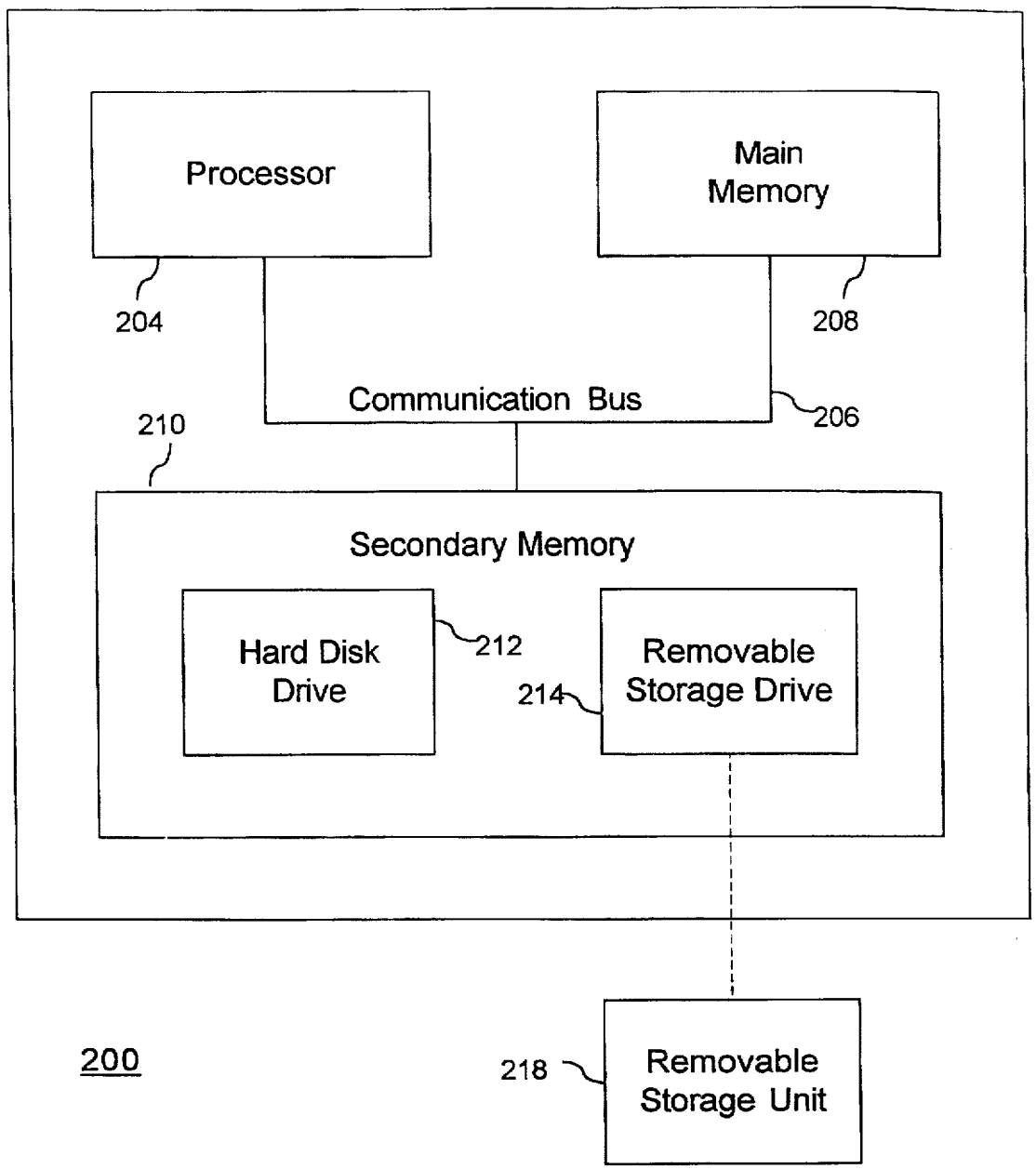
FIG. 2 depicts an exemplary hardware configuration for settop computer 112 according to the present invention.

In one embodiment, the present invention is directed to a computer system 200 operating as discussed herein. An exemplary hardware configuration for computer system 200 is shown in FIG. 2. Computer system 200 includes one or more processors, such as processor 204. The processor 204 is connected to a communication bus 206.

Computer system 200 also includes a main memory 208, preferably random access memory (RAM), and an optional secondary memory 210. Secondary memory 210 may be local to processor 204 or remote. In a preferred embodiment of the present invention, secondary memory 210 resides in remote servers 102. In an alternative embodiment of the present invention, secondary memory 210 resides in a local hardware cartridge or state machine. In another alternative embodiment of the present invention, secondary memory 210 may be partitioned into local and remote portions. The secondary memory 210 can include, for example, a hard disk drive 212 and a removable storage drive 214 (representing a floppy disk drive, a magnetic tape drive, a compact disk drive, or the like). The removable storage drive 214 reads from and/or writes to a removable storage unit 218 in a well known manner.

Removable storage unit 218, also called a program storage device or a computer program product, represents a floppy disk, magnetic tape, compact disk, etc. As will be appreciated, the removable storage unit 218 includes a computer usable storage medium having stored therein computer software and/or data.

Computer programs (also called computer control logic) are stored in main memory 208 and/or the secondary memory 210. Such computer programs, when executed, enable computer system 200 to perform the features of the present invention as discussed herein. In particular, the computer programs, when executed, enable the processor 204 to perform the features of the present invention. Accordingly, such computer programs represent controllers of the computer system 200.

In another embodiment, the invention is directed to a computer program product comprising a computer readable medium having control logic (computer software) stored therein. The control logic, when executed by the processor 204, causes the processor 204 to perform the functions of the invention as described herein.

In still another embodiment, the invention is implemented primarily in hardware using, for example, a hardware state machine. Implementation of the hardware state machine so as to perform the functions described herein will be apparent to persons skilled in the relevant art(s).

Figure 3:
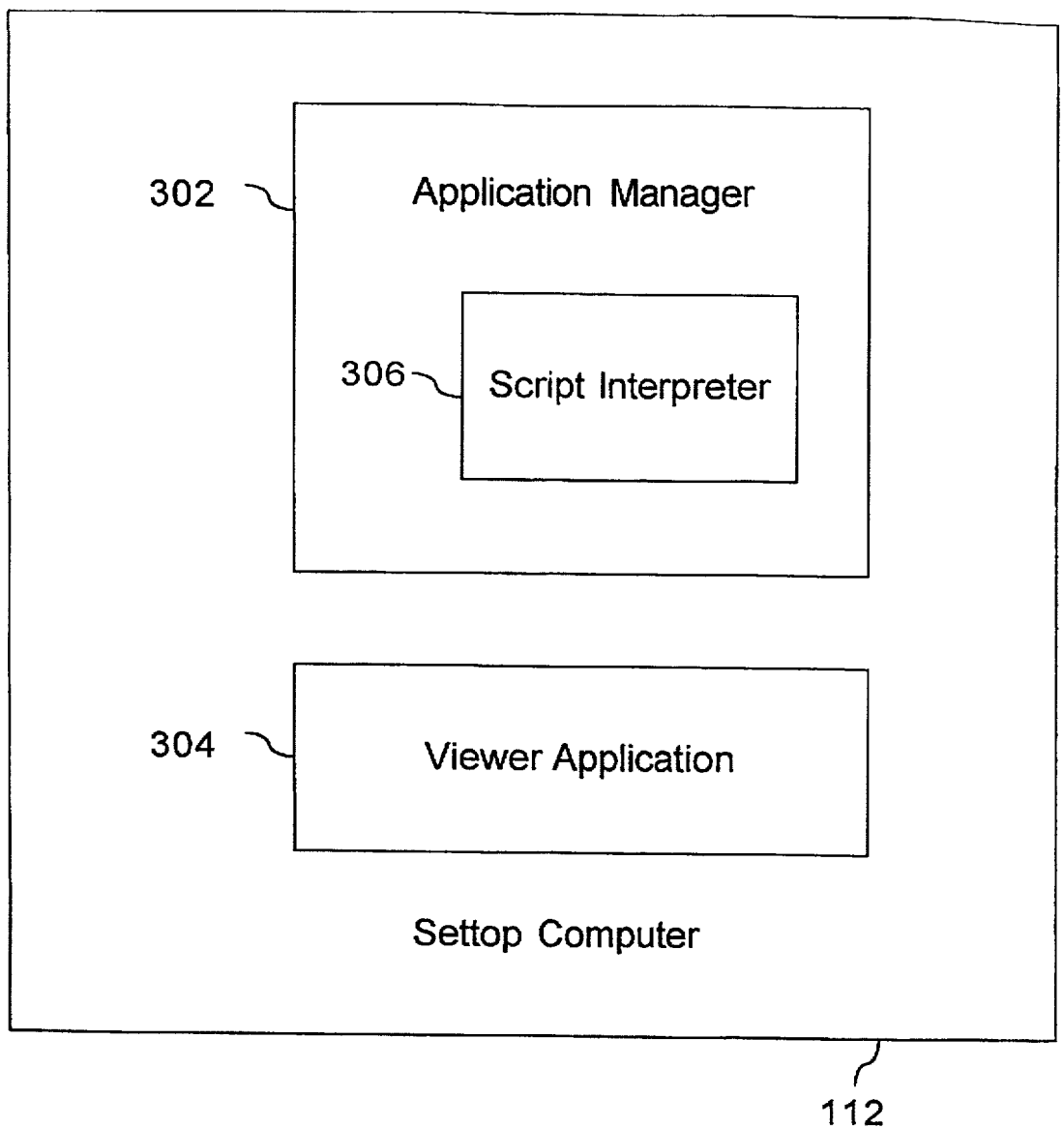
FIG. 3 depicts the settop software environment for settop computer 112 according to the present invention.

FIG. 3 depicts the settop software environment for settop computer 112 according to the present invention. Referring to FIG. 3, the settop software environment includes three components: application manager 302, a viewer application 304, and a script interpreter 306. Application manager 302, viewer application 304, and script interpreter 306, when executed, enable settop computer 112 to perform the features of the present invention as discussed herein. Thus, application manager 302, viewer application 304, and script interpreter 306 represent controllers of settop computer 112. The components of the settop software environment are described below.

Application manager 302 causes viewer applications 304 to be executed on a settop computer 112. Application manager 302 is downloaded when settop computer 112 is powered on and is responsible for downloading, managing, and terminating all other resident applications.

Viewer application 304, downloaded by application manager 302 from a remote server 102, is the primary application running on settop computer 112. Examples of viewer applications 304 are video-on-demand, home shopping, gaming applications, and the like. Only one viewer application 304 runs on settop computer 112 at a time.

Script interpreter 306 interprets and executes scripts that are downloaded in cover bundles. Script interpreter 306 is a component of application manager 302 and so is downloaded with application manager 302 when settop computer 112 is powered on.

In operation, remote servers 102 store the control logic for a number of applications including viewer applications 304 and application manager 302.

When settop computer 112 is powered on, application manager 302 is downloaded from remote server 102. The user then employs remote control 110 to select television channels, whether passive or interactive, by interacting with application manager 302. Each interactive channel can represent one or more viewer applications 304. When a user selects a viewer application 304, application manager 302 downloads that application to settop computer 112 and launches it for viewing.

When a viewer application 304 employs a cover bundle, the name of the cover bundle is substituted for the name of the viewer application 304. Then, when the user selects a viewer application 304 having a cover bundle, application manager 302 requests the cover bundle, which in turn retrieves the selected viewer application 304. The cover bundle contains "asset" files (i.e., files containing images, movies, sounds, fonts, etc.) that are presented to the user to grab his attention and keep him engaged while selected viewer application 304 downloads. For example, the cover bundle could display the name of selected viewer application 304 over an intriguing image or a short movie (e.g., computer-generated or motion picture) accompanied by a piece of music until selected viewer application 304 has successfully downloaded.

Figure 4:
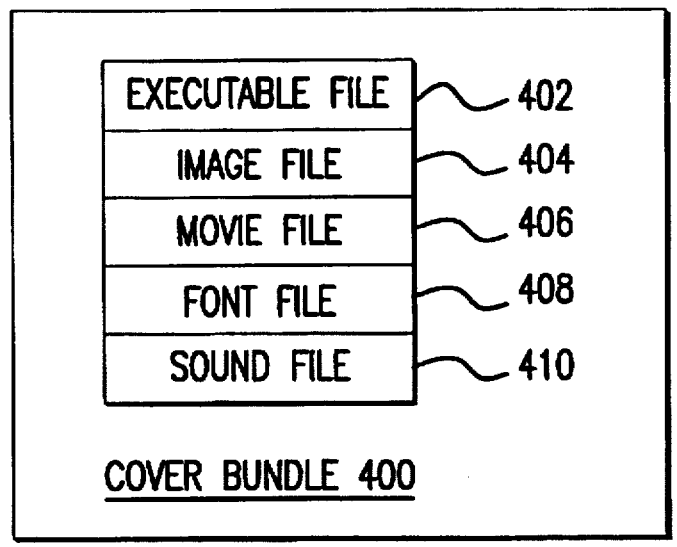
FIG. 4 depicts an exemplary cover bundle 400 according to a first embodiment of the present invention.

In a first embodiment of the present invention, the cover bundle comprises a number of asset files and an executable file for managing and presenting the asset files and for retrieving selected viewer application 304. FIG. 4 depicts an exemplary cover bundle 400 according to a first embodiment of the present invention. Cover bundle 400 comprises an executable file 402, an image file 404, a movie file 406, a font file 408, and a sound file 410. As will be apparent to one skilled in the art, cover bundle 400 is not confined to the number and/or type of asset files shown in FIG. 4, but must comprise at least one executable file 402.

Figure 5:
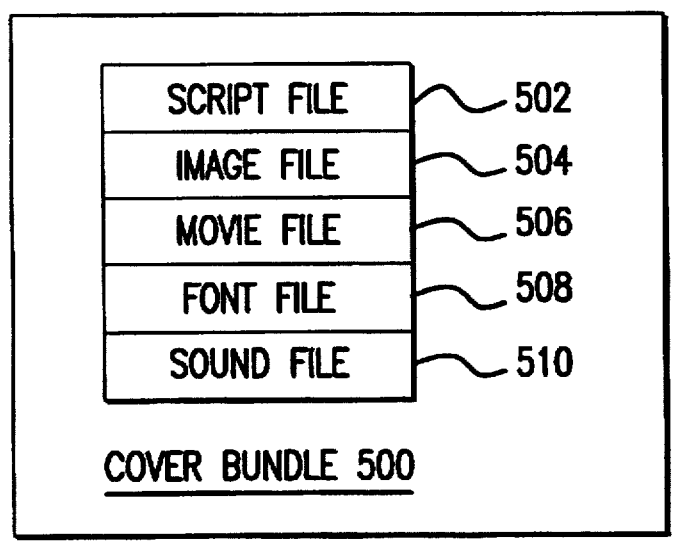
FIG. 5 depicts an exemplary cover bundle 500 according to a second embodiment of the present invention.

In a second embodiment, the cover bundle comprises a number of asset files and a script file which is employed by script interpreter 306 to manage and present the asset files and to retrieve selected viewer application 304. FIG. 5 depicts an exemplary cover bundle 500 according to a second embodiment of the present invention. Cover bundle 500 comprises a script file 502, an image file 504, a movie file 506, a font file 508, and a sound file 510. As will be apparent to one skilled in the art, cover bundle 500 is not confined to the number and/or type of asset files shown in FIG. 5, but must comprise at least one script file 502.

Figure 6:
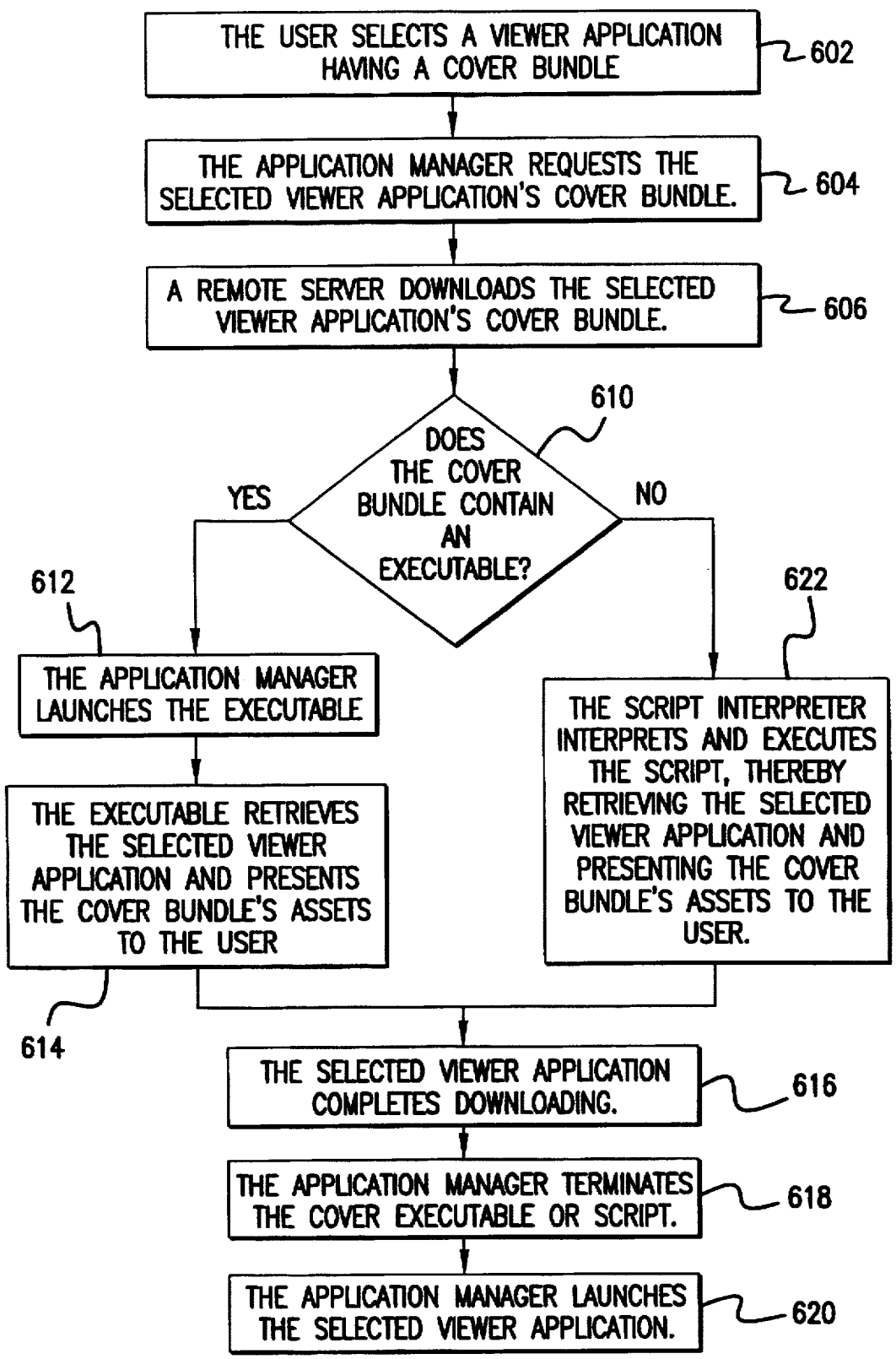
FIG. 6 is a flowchart depicting the operation of settop computer 112 according to the present invention.

FIG. 6 is a flowchart depicting the operation of settop computer 112 according to the present invention. As shown at step 602, the user employs remote control 110 to select a viewer application 304 having a cover bundle. In response, application manager 302 requests the selected viewer application's cover bundle, as shown at step 604. As shown at step 606, a remote server 102 responds to the request by downloading the cover bundle to settop computer 112. As shown at step 610, application manager 302 examines the cover bundle to determine whether it contains an executable file.

If an executable file is found, it is launched by application manager 302, as shown at step 612, in accordance with the first embodiment of the present invention. As shown at step 614, the executable retrieves the selected viewer application 304 and presents the cover bundle's assets to the user. After the selected viewer application 304 has downloaded, as shown at step 616, application manager 302 terminates the executable, as shown at step 618, and launches selected viewer application 304, as shown at step 620.

If no executable is found, then the cover bundle contains a script in accordance with the second embodiment of the present invention. As shown at step 622, script interpreter 306 interprets and executes the script, thereby retrieving selected viewer application 304 and presenting the cover bundle's assets to the user. After the selected viewer application 304 has downloaded, as shown at step 616, application manager 302 terminates the script, as shown at step 618, and launches selected viewer application 304, as shown at step 620.

While various embodiments of the present invention have been described above, it should be understood that they have been presented by way of example, and not limitation. It will be apparent to persons skilled in the relevant art that various changes in form and detail can be made therein without departing from the spirit and scope of the invention. Thus the present invention should not be limited by any of the above-described exemplary embodiments, but should be defined only in accordance with the following claims and their equivalents.

What is claimed is:

1. An interactive television system, configured to provide immediate feedback to the user via cover bundles, comprising:

at least one remote server comprising at least one viewer application having a cover bundle, said cover bundle comprising
   at least one asset file,
   presenting means for presenting said asset file to the user, and
   retrieving means for retrieving said viewer application, and at least one settop computer coupled to said remote server, configured to retrieve said cover bundle and execute said presenting means and said retrieving means when a user requests said viewer application.

2. The system of claim 1, wherein said presenting means comprises an executable file for presenting said asset file to the user.

3. The system of claim 1, wherein said presenting means comprises a script file, and wherein said settop computer comprises a script interpreter configured to interpret said script file for presenting said asset file to the user.

4. In an interactive television system, a method for providing immediate feedback to a user comprising the steps of:

(a) downloading a cover bundle to a user's settop computer when the user requests a viewer application having said cover bundle, said cover bundle comprising at least one asset file, presenting means for presenting said asset file to the user and retrieving means for retrieving said viewer application;

(b) executing said presenting means to thereby present said asset file to the user; and (c) executing said retrieving means to thereby retrieve said viewer application.

5. The method of claim 4, further comprising the steps of:

(d) terminating presentation of said asset file when said viewer application has been retrieved; and (e) launching said viewer application.

6. The method of claim 4, wherein step (b) comprises the step of:

(i) launching an executable file, wherein said executable file is an element of said cover bundle and presents said asset to the user.

7. The method of claim 4, wherein step (b) comprises the step of:

(i) interpreting a script file, wherein said script file is an element of said cover bundle and presents said asset to the user.

8. A computer program product comprising a computer useable medium having computer readable program code means embodied in said medium for causing a processor in a settop computer in an interactive television system to provide immediate feedback to a user, said computer readable program code means comprising:

a computer readable first program code means for causing the processor to download a cover bundle to the user's settop computer when the user requests a viewer application having said cover bundle, said cover bundle comprising at least one asset, presenting means for presenting said asset to the user, and retrieving means for retrieving said viewer application;

a computer readable second program code means for causing the processor to execute said presenting means to present said asset file to the user; and a computer readable third program code means for causing the processor to execute said retrieving means to retrieve said viewer application.

9. The computer program product of claim 8, further comprising:

a computer readable fourth program code means for causing the processor to terminate presentation of said assets when said viewer application has been retrieved; and a computer readable fifth program code means for causing the processor to launch said viewer application.

10. The computer program product of claim 8, wherein said computer readable second program code means further comprises an executable file for presenting said asset file to the user.

11. The computer program product of claim 8, wherein said computer readable second program code means comprises a script file to be interpreted by a script interpreter in the settop computer for presenting said asset file to the user.

* * * * *